3,140,273
POLYETHER BASED POLYURETHANE COATING
COMPOSITIONS
Günther Nischk, Leverkusen, Ferdinand Münz, Cologne-Stammheim, and Otto Bayer and Manfred Theis, Leverkusen, Germany, assignors to Farbenfabriken Bayer Aktiengesellschaft, Leverkusen, Germany, a corporation of Germany
No Drawing. Filed Jan. 29, 1959, Ser. No. 789,797
Claims priority, application Germany Feb. 4, 1958
4 Claims. (Cl. 260—77.5)

This invention relates generally to coating compositions and, more particularly, to new and novel coating compositions comprising the reaction product of polyhydroxyl polyethers and polyisocyanates.

The production of solvent-resisting lacquer coatings from polyhydroxyl compounds and polyisocyanates is known. Commercially, it has heretofore been the practice to employ as polyhydroxyl compounds saturated or unsaturated polyesters having terminal hydroxyl groups and which are obtained by condensing dicarboxylic or polycarboxylic acids with an excess of polyhydric alcohols. These polyesters are reacted with any suitable organic polyisocyanate to provide scratch-resisting and solvent-resisting lacquer coatings. The mechanical properties of these lacquer coatings are excellent, however, owing to the plurality of ester groups, they are not generally stable to hot water and saponifying agents. For example, they are destroyed within about seventy hours by boiling in a 10% solution of either caustic potash or sulphuric acid.

It is, therefore, an object of the invention to provide improved coating compositions. It is a further object of the invention to provide coating compositions having an improved resistance to saponification. A still further object of the invention is to provide new and novel coating compositions. A still further object of the invention is to provide a process for the manufacture of improved coatings. A still further object of the invention is to provide a process for the production of coatings resistant to saponification.

The above objects and others are accomplished in accordance with the invention, generally speaking, by providing a coating composition comprising the reaction product of an organic polyisocyanate, a polyhydroxyl polyether which contains, as the sole members linking the hydrocarbon radicals, the molecular groupings

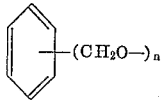

wherein $n$ is an integer of from 2 to 6, and wherein the aromatic ring can comprise any desired additional substituents or may be a part of a condensed ring system.

Any suitable polyhydroxyl polyether as above defined may be used in accordance with the invention. Generally speaking, however, the suitable polyhydroxyl polyethers according to the invention have an hydroxyl number of from about 40 to about 500 and, preferably, between about 150 and about 250 and a molecular weight of at least about 300.

Suitable polyhydroxyl polyethers may be prepared by several processes, for example, by the condensation of 1,3-xylylene glycol, 1,4-xylylene glycol, or 1,4-dimethanol naphthalene, or by reacting 1,3-xylylene dichloride, 1,4-xylylene dichloride, 1,4-dichloromethyl naphthalene, or p,p'-dichloromethyl diphenyl ether with polyalcohols in presence of a caustic potash solution.

A process for the manufacture of suitable polyhydroxyl polyethers is disclosed in United States patent application Serial Number 724,840, filed March 31, 1958. According to that process, benzyl glycols or their alkyl ethers may be reacted with polyalcohols in the presence of acid catalysts to provide polyhydroxyl polyethers having terminal hydroxyl groups formed by transetherification with the splitting off of alcohols. These compounds contain benzyl ether groupings which are the only elements linking the hydrocarbon radicals. The same patent application discloses that benzyl alkyl ethers may be obtained, in the simplest possible manner from a technical and economical view, by a degradation reaction of the condensation product of aromatic hydrocarbons and formaldehyde with lower aliphatic alcohols in the presence of an acid catalyst. The benzyl alkyl ethers may then be reacted with polyalcohols in the presence of an acid catalyst to provide suitable polyhydroxyl polyethers.

Still another process for the manufacture of suitable polyhydroxyl polyethers is disclosed in United States patent application Serial No. 788,060. According to that process, condensation products of aromatic hydrocarbons and formaldehyde are heated in the presence of an acid catalyst to provide a modified condensation product free of acetal groups. The modified condensation product may then be reacted with polyhydric alcohols in the presence of an acid catalyst to provide suitable polyhydroxyl polyethers in accordance with the invention.

Any suitable organic polyisocyanate may be used in accordance with the invention. Examples of suitable organic polyisocyanates include pentamethylene diisocyanate, hexamethylene diisocyanate, 1,4-cyclohexylene diisocyanate, 4,4'-diphenyl methane diisocyanate, p-phenylene diisocyanate, 2,4- and 2,6-tolylene diisocyanate and mixtures thereof, 1,5-naphthalene diisocyanate, and 4,4',4''-triphenyl methane triisocyanate, as well as polyisocyanates of higher molecular weight, such as, for example, the polymerization products of diisocyanates and triisocyanates or the reaction products of polyhydric alcohols with an excess of diisocyanate. Suitable organic polyisocyanates also include compounds which liberate isocyanate groups at elevated temperatures, such as, for example, compounds which are addition products of polyisocyanates with phenols, malonic esters, and imines.

The coating compositions are compounded by simply mixing the polyhydroxyl polyethers with the polyisocyanates, preferably, in a suitable solvent therefor. The coating composition may be applied to any suitable substrate by any suitable means, such as, brushing, spraying, dipping, and the like, and the coating cured at room temperature, or at elevated temperatures if desired. Elevated temperatures must be used where the organic polyisocyanate is a compound which liberates isocyanate groups at elevated temperatures. The quantity of organic polyisocyanate which is used for the composition generally depends upon the hydroxyl number of the polyether. While ordinarily sufficient organic polyisocyanate is provided to react with all of the hydroxyl groups of the polyether, the molar ratio of the isocyanate groups of the polyisocyanates to the hydroxyl groups of the polyether may vary between an NCO/OH ratio of from about 1:0.5 to about 1:2.

Any suitable solvent may be used in accordance with the invention. Examples of suitable solvents include ethyl acetate, butyl acetate, acetone, cyclohexanone, and monomethyl ether glycol acetate. Preferably, these solvents are used in admixture with aromatic hydrocarbons, such as, for example, benzene, tolylene and the like.

By a suitable variation of the polyether or the polyisocyanate and the proportions thereof, lacquer coatings having a wide range of mechanical properties may be produced.

According to one preferred embodiment of the invention, the polyhydroxyl polyethers having the structure as hereinbefore defined may be modified with monoepoxides or polyepoxides. By this slight modification, it is possible to achieve an increase in the molecular weight of the polyhydroxyl polyether without any substantial decrease in the hydroxyl number. By adding the monoepoxides or polyepoxides, an advantageous effect on the hardness and elasticity of the lacquer coatings is obtained.

The monoepoxides or polyepoxides may be added to the terminal hydroxyl groups of the polyhydroxyl polyether by any suitable method, such as, for example, by heating the components together for several hours in the presence of acid or alkyline catalysts. The ratio by weight to the reaction of the monoepoxide or the polyepoxide with the polyhydroxyl polyether may be up to about 1:1. Examples of suitable monoepoxides or polyepoxides which may be used to modify the polyhydroxyl polyethers hereinbefore defined are the monoepoxides of the formula

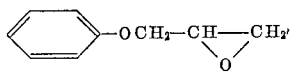

1,4-butylene glycol diglycidyl ether and the epoxide obtained from reacting 2 mols of 1,4-butylene glycol diglycidyl ether and 1 mol of 4,4'-dihydroxy diphenyl methyl methane.

The reaction of the polyhydroxyl polyethers and the polyisocyanates which leads to the formation of the lacquer coatings may be carried out in the presence of any suitable reaction accelerator or reaction retarder, such as, for example, in the presence of the tertiary amines, minerals acids, carboxylic acids, sulphonic acids, acid chlorides, metal salts, or organic metallic compounds, and the like. Moreover, any suitable dye, pigment, filler, or flow agent, and the like may be admixed with the coating composition of the invention.

The coating compositions of the present invention provide excellent lacquer coatings and are useful generally where other lacquer coatings are useful. The coating compositions of the invention are, however, particularly useful in industrial coatings and the like where the coating is apt to be exposed to hot water or saponifying agents. Coating compositions according to the invention are stable for more than 100 hours with respect to boiling 10% caustic potash solution or boiling 10% sulfuric acid solutions. The high resistance to saponification provided by the lacquer coatings of the invention is surprising and cannot be accounted for solely because of the lack of ester groups in the lacquer film. For example, it is known that lacquer coatings derived from polyisocyanates and novolaks which have been alkoxylated on the phenolic hydroxyl group are not resistant to saponification although such novolaks per se do not have ester groups which are subject to saponification.

The invention will be further illustrated by the following examples without limitation thereto, the parts being by weight.

*Example 1*

About 582 parts by weight of technical 2,4-dimethyl-1,5-xylylene glycol dimethyl ether and about 536 parts by weight of trimethylol propane are condensed in the presence of 1.1 parts by weight of p-tolylene sulphonic acid by the process disclosed in U.S. patent application S.N. 724,840, filed March 31, 1958, to form a polyhydroxyl compound with an OH number of about 350. About 10 parts by weight of this polyhydroxyl compound are dissolved together with about 18.4 parts by weight of a 75% ethyl acetate solution of the reaction product of 1 mol of trimethylol propane and 3 mols of tolylene diisocyanate and with about 0.5 part by weight of a 10% polyvinyl ether solution as flow agent in about 30.6 parts by weight of a solvent mixture consisting of butyl acetate, ethyl acetate, methyl glycol acetate, and tolylene. In this lacquer mixture, the OH number of the polyhydroxyl compound is equivalent to the NCO number of the triisocyanate.

Using this lacquer solution, a metal bar is lacquered four times, the said bar thereafter being left to stand for eight days. The result is a highly lustrous lacquer layer on the metal bar, the said layer being very resistant to scratching and extremely resistant to saponification; the stability thereof in 10% boiling caustic potash solution is 520 hours and in 10% boiling sulphuric acid, 670 hours.

*Example 2*

About 300 parts by weight of a xylene formaldehyde resin decomposed at about 150° C. with methanol, and about 120 parts by weight of trimethylol propane are condensed in the presence of 0.5 part by weight of p-tolylene sulphonic acid at 170° C. and in accordance with the process disclosed in U.S. patent application S.N. 724,840, filed March 31, 1958, now U.S. Patent 3,096,296. The resulting polyhydroxyl compound has an OH number of about 165.

About 10 parts by weight of this polyhydroxyl compound are dissolved together with about 8.2 parts by weight of the 75% triisocyanate solution described in Example 1 and about 1.6 parts by weight of a 10% polyvinyl ether solution as flow agent in about 20.6 parts by weight of the solvent mixture mentioned in Example 1.

Metal bars are sprayed four times with this lacquer solution, and the bars are thereafter left to stand for about eight days with access of air. A lacquer, which is very resistant to scratching and saponification, is obtained. The degree of cross-linking is 100%. The lacquer layer is destroyed only after 563 hours when it is boiled in 10% caustic potash solution and only after 672 hours on boiling in 10% sulphuric acid.

If the same lacquer solution is used, but only about 5.8 parts by weight of the 75% triisocyanate solution and only about 16.6 parts by weight of the solvent mixture; i.e., a 30% deficiency of polyisocyanate is used, and if the sprayed metal bars are oven dried for one hour at 120° C., a lacquer coating, which is resistant for 590 hours to 10% boiling sulphuric acid and for 513 hours to 10% boiling caustic potash solution, is obtained.

*Example 3*

About 300 parts by weight of a xylene formaldehyde resin decomposed at about 150° C. with methanol, and about 120 parts by weight of trimethanol propane are condensed at about 170° C. by the process disclosed in U.S. patent application S.N. 724,840, filed March 31, 1958, and in the presence of 0.5 part by weight of p-tolylene sulphonic acid. The resulting polyhydroxyl compound has an OH number of about 123.

About 10 parts by weight of this polyhydroxyl compound, 6 parts by weight of the 75% triisocyanate solution described in Example 1, and 1.4 parts by weight of a 10% polyvinyl ether solution as flow agent are dissolved in about 19.8 parts by weight of the solvent mixture described in Example 1. The polyhydroxyl compound and the polyisocyanate are present in equivalent quantities.

A metal plate is lacquered four times with this lacquer solution. After the plate has stood for eight days, the resistance to saponification of the lacquer layer in 10% boiling sulphuric acid is 541 hours and in 10% boiling caustic potash solution is 507 hours.

*Example 4*

A polyhydroxyl compound is prepared as described in Example 2 from about 300 parts by weight of xylene formaldehyde resin and about 120 parts by weight of trimethylol propane. To this polyhydroxyl compound are added about 90 parts by weight of a diepoxide (epoxide equivalent 520) which has been obtained from 2 mols of 1,4-butylene glycol diglycidyl ether and 1 mol of 4,4-dihydroxydiphenyl dimethyl methane. The reaction mixture is heated for five hours at 170 to 175° C. The modified polyhydroxyl compound which is obtained has an OH number of about 180.

A lacquer mixture is prepared from the following components: 12.1 parts by weight of a 50% solution of the aforesaid modified polyhydroxyl compound in the solvent mixture mentioned in Example 1, 1.7 parts by weight of a 10% polyvinyl ether solution as flow agent, 11.1 parts by weight of the solvent mixture mentioned in Example 1, 19.5 parts by weight of a pigment trituration of 10 parts by weight of the polyhydroxyl compound described in Example 2, 30 parts by weight of titanium dioxide and 10 parts by weight of the solvent mixture described in Example 1, and 9.0 parts by weight of the 75% triisocyanate solution described in Example 1.

Metal bars are coated four times with this lacquer mixture. After being left to stand for eight days at room temperature, these bars are boiled in 10% caustic potash solution and in 10% sulphuric acid solution, respectively. The stability in the first case is 590 hours and in the second case is 640 hours.

*Example 5*

About 300 parts by weight of a xylene formaldehyde resin decomposed at about 150° C. with methanol, and about 110 parts by weight of trimethylol ethane are condensed at about 165° C. by the process disclosed in U.S. patent application S.N. 724,840, filed March 31, 1958, in the presence of 0.5 part by weight of p-tolylene sulphonic acid. To the resulting polyhydroxyl compound (OH number 180) is added 70 parts by weight of a diepoxide of 2 mols of 1,4-butylene glycol diglycidyl ether and 1 mol of 4,4'-dihydroxydiphenyl dimethyl methane (epoxide equivalent 520). The reaction mixture is heated for 6 hours at 170 to 175° C. The modified polyhydroxyl compound which is obtained has an OH number of about 178.

A lacquer mixture is now prepared from the following components: 10.0 parts by weight of the modified polyhydroxyl compound, 1.5 parts by weight of a 10% solution of a copolymer of styrene and maleic acid dodecyl semi-ester as flow agent, 20.0 parts by weight of a solvent mixture of equal parts of xylene, cyclohexanone, acetone and ethyl acetate, and 15.0 parts by weight of a 75% ethyl acetate solution of the trimerization product of tolylene-2,4-diisocyanate.

A metal bar is lacquered four times with this lacquer mixture and is left to stand for eight days at room temperature. A lacquer layer with a high lustre is obtained, which layer is only destroyed by 10% boiling caustic potash solution after 490 hours and by 10% boiling sulphuric acid after 520 hours.

If the trimerization product of tolylene-2,4-diisocyanate is replaced by about 25 parts by weight of a 75% ethyl acetate solution of a masked triisocyanate obtained from 1 mol of trimethylol propane, 3 mols of tolylene diisocyanate and 3 mols of phenol, the lacquer coating on the metal bar should be stoved at 170° C. Its resistance to hydrolysis corresponds to that referred to above.

*Example 6*

350 parts by weight of 1,4-xylylene dichloride are heated to boiling with 360 parts by weight of trimethylol propane in 700 parts by volume of benzene. Within 2 hours a 50% aqueous sodium hydroxide solution (containing 165 parts by weight of sodium hydroxide) is dropped into the mixture. The mixture is then boiled for 10 hours. The water is removed by azeotropic distillation with the recycled benzene. After cooling to below 100° C. water is added in such an amount that the precipitated salt is dissolved. The aqueous phase is then separated from the organic phase. After treating with fuller's earth the benzene is distilled off. The resulting polyhydroxy compound has an OH number of 300.

About 10 parts by weight of this polyhydroxy compound are dissolved together with about 15.7 parts by weight of a 75% ethyl acetate solution of the reaction product of 1 mol of trimethylol propane and 3 mols of toluylene diisocyanate and with about 0.5 part by weight of a 10% polyvinyl ether solution as flow agent in about 25 parts by weight of a solvent mixture consisting of butyl acetate, ethyl acetate, methyl glycolacetate and toluene.

Using this lacquer solution a metal bar is lacquered four times, the said bar thereafter being left to stand for 8 days. The lacquer layer is very resistant to saponification. The stability thereof in 10% boiling caustic potash solution is 500 hours, and in 10% boiling sulphuric acid 540 hours.

*Example 7*

406 parts by weight of 4.6-di-(chloro methyl)-m-xylene are condensed together with 180 parts by weight of hexene triol and 120 parts by weight of butane diol-1.3 in the same way as described in Example 6 to give a polyhydroxy compound with an OH number of 260.

About 10 parts by weight of this polyhydroxy compound are dissolved together with about 13.6 parts by weight of the 75% triisocyanate solution described in Example 1, and about 0.5 part by weight of a 10% polyvinyl ether solution as flow agent in about 25 parts by weight of the solvent mixture mentioned in Example 6.

Metal bars are sprayed four times with the lacquer solution and the bars are thereafter left to stand for about 8 days with excess of air. A lacquer is obtained which is very resistant to scratching and saponification. The lacquer is destroyed only after 540 hours when it is boiled in 10% caustic potash solution, and only after 610 hours on boiling in 10% sulphuric acid.

It is to be understood that any suitable polyhydroxyl polyether as defined herein, any suitable organic polyisocyanate as hereinbefore listed, and any suitable solvent as hereinbefore listed, may be substituted in any of the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:
1. A coating composition which comprises:
 (a) the reaction product of an organic polyisocyanate having at least three —NCO groups and a polyhydroxyl polyether having at least three hydroxyl groups, said reactants added in such amounts that the —NCO to —OH ratio is from about 1:0.5 to about 1:2;
 (b) said polyhydroxyl polyester obtained by a process which comprises the condensation reaction of an aromatic polyol and an aliphatic polyhydric alcohol containing at least three —OH groups, said aromatic polyol having from 2 to 6 —CH₂OH groups attached to the aromatic ring;
 (c) said polyhydric polyether therefore containing aromatic ring structures having attached thereto from 2 to 6 (CH₂O)- groups, each —CH₂O— group being the single linkage between the hydrocarbon radicals of said aliphatic polyhydric alcohol and said aromatic glycol.
2. The composition of claim 1 wherein said polyether is reacted with a member selected from the group consisting of monoepoxides and diepoxides prior to said polyether-polyisocyanate reaction step.
3. A process for making a coating composition which comprises:
 (a) the reaction product of an organic polyisocyanate having at least three —NCO groups and a polyhydroxyl polyether having at least three hydroxyl groups, said reactants added in such amounts that the —NCO to —OH ratio is from about 1:0.5 to about 1:2;
 (b) said polyhydroxyl polyether obtained by a process which comprises the condensation reaction of an aromatic polyol and an aliphatic polyhydric alcohol containing at least three —OH groups, said aro- matic polyol having from 2 to 6 —CH₂OH groups attached to the aromatic ring;

(c) said polyhydric polyether therefore containing aromatic ring structures having attached thereto from 2 to 6 (CH₂O) groups, each —CH₂O— group being the single linkage between the hydrocarbon radicals of said aliphatic polyhydric alcohol and said aromatic glycol.

4. The process of claim 3 wherein said polyether is reacted with a member selected from the group consisting of monoepoxides and diepoxides prior to said polyether-polyisocyanate reaction step.

References Cited in the file of this patent

UNITED STATES PATENTS 2,843,568  Benning et al. _____ July 15, 1958

FOREIGN PATENTS 205,456  Australia _____ Feb. 10, 1955

UNITED STATES PATENT OFFICE
CERTIFICATE OF CORRECTION

Patent No. 3,140,273 July 7, 1964

Günther Nischk et al.

It is hereby certified that error appears in the above numbered patent requiring correction and that the said Letters Patent should read as corrected below.

Column 4, line 27, for "access" read -- excess --; column 6, line 10, for "4.6-di-" read -- 4,6-di- --; line 12, for "diol-1.3" read -- diol-1,3 --; line 48, for "polyester" read -- polyether --; same column 6, line 59, and column 7, line 8, for "glycol", each occurrence, read -- polyol --.

Signed and sealed this 27th day of July 1965.

(SEAL)
Attest:

ERNEST W. SWIDER
Attesting Officer

EDWARD J. BRENNER
Commissioner of Patents